UNITED STATES PATENT OFFICE.

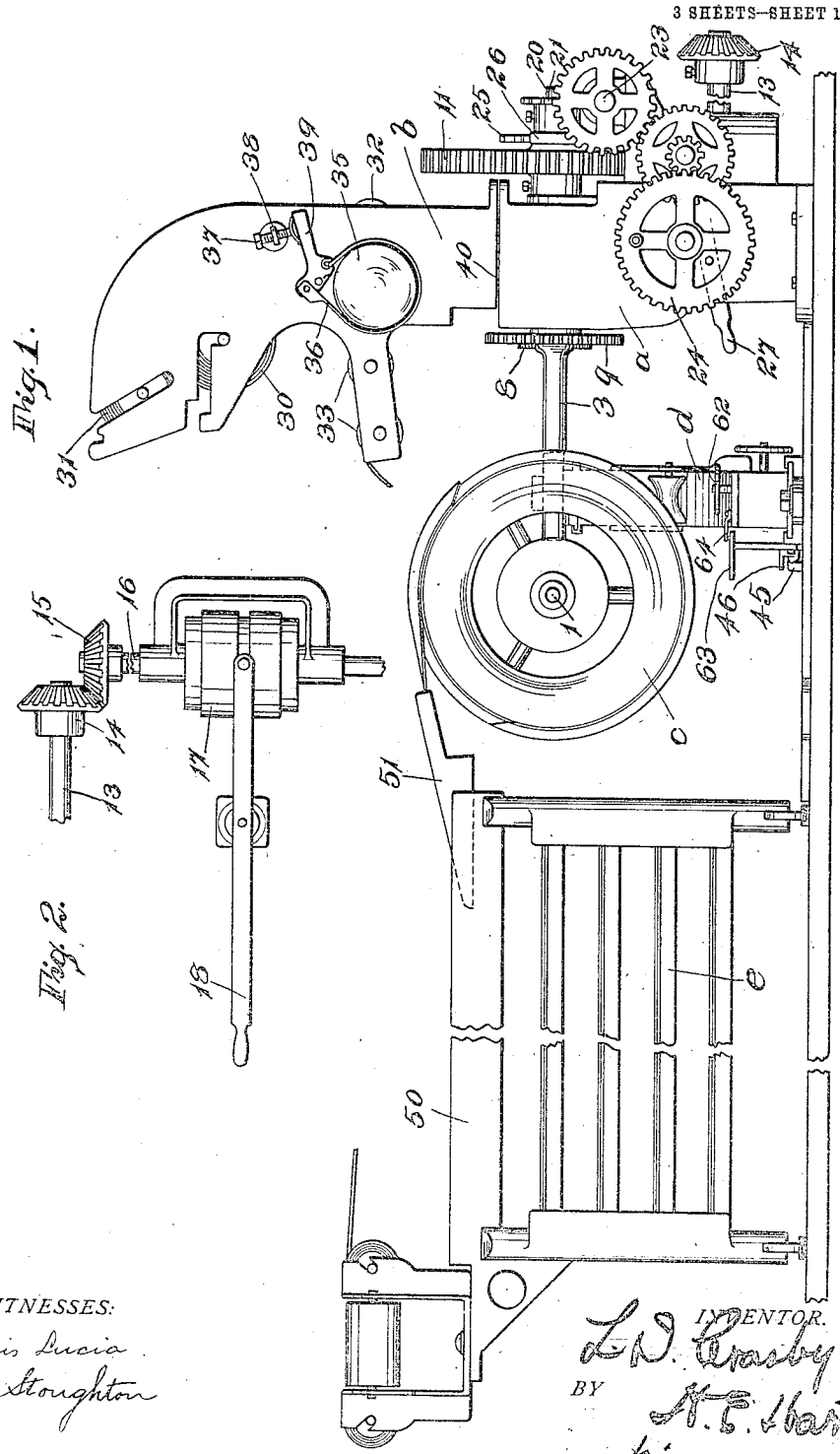

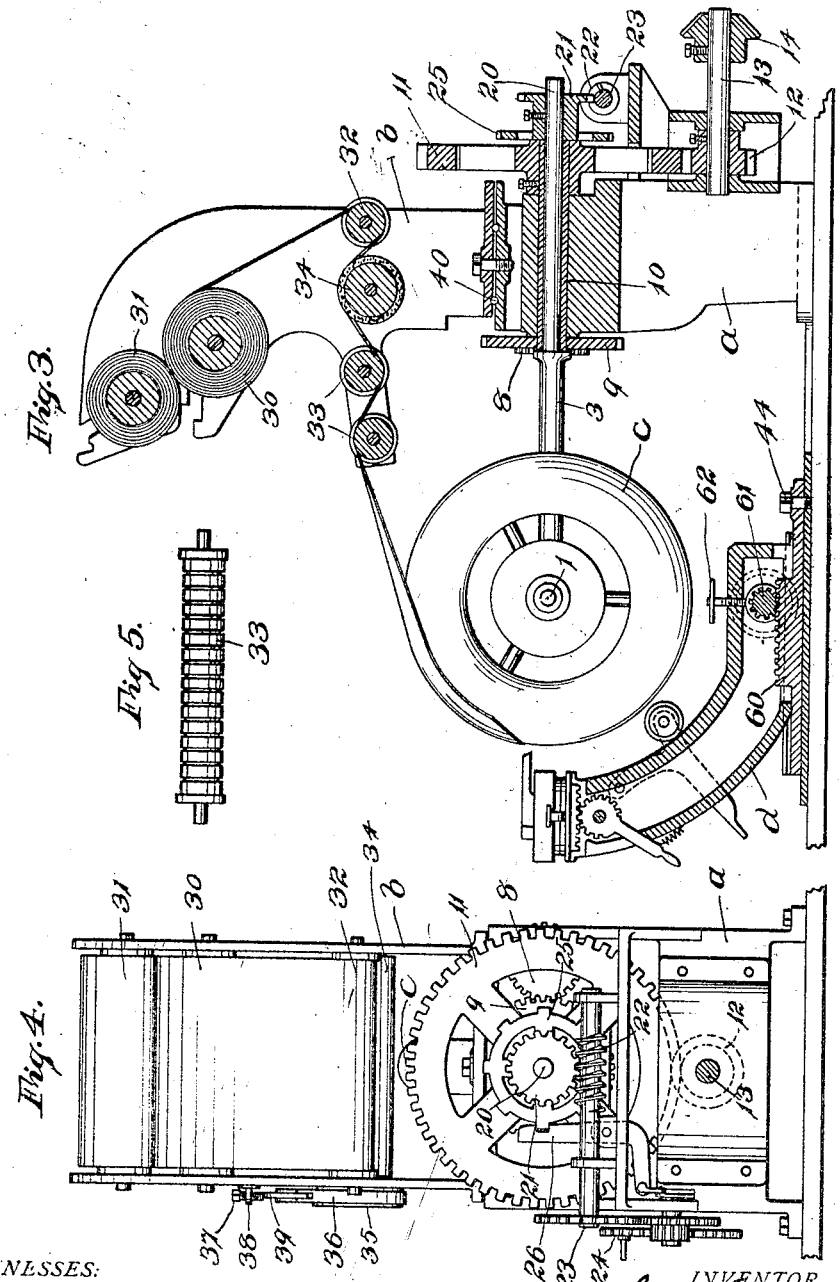

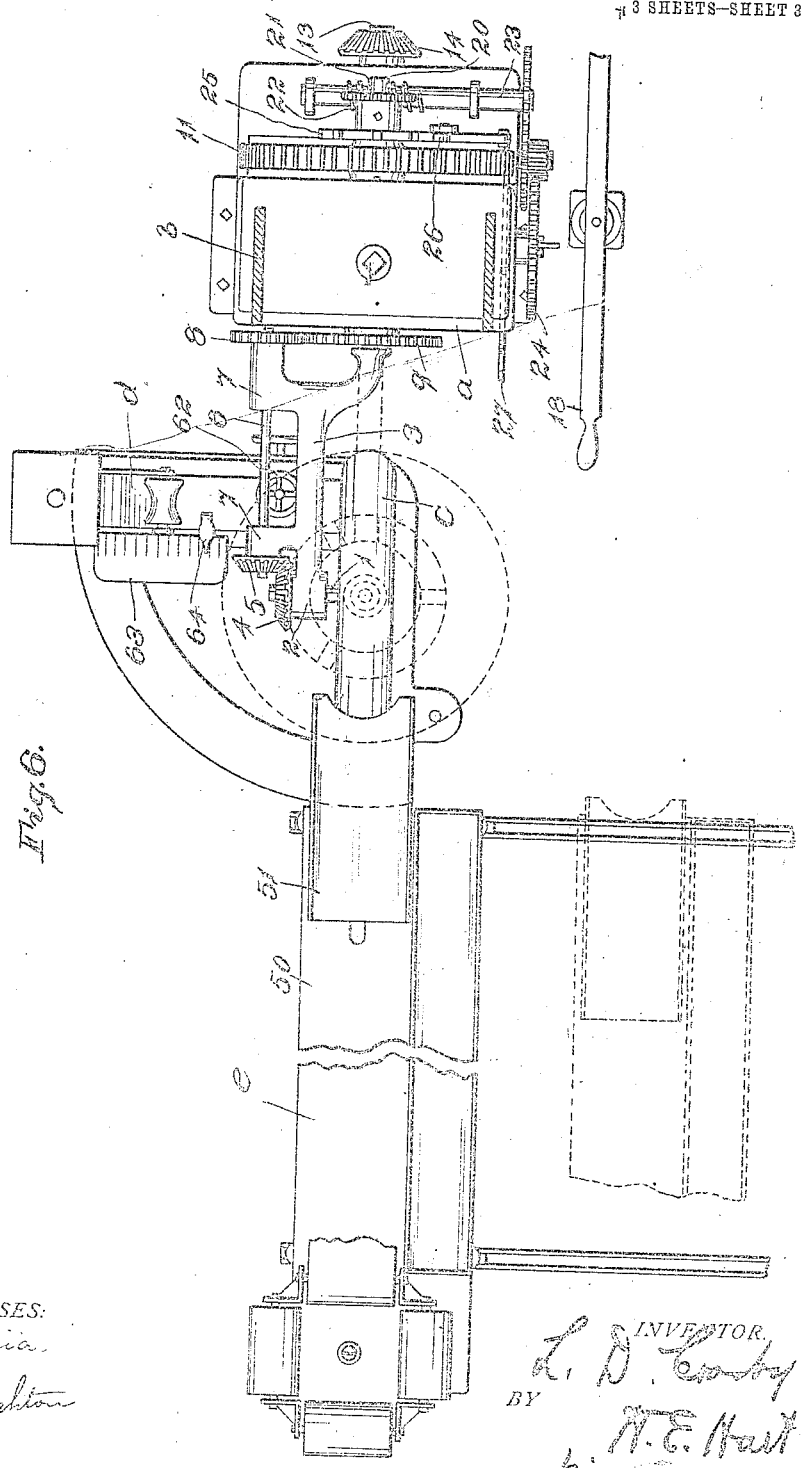

LESTER D. CROSBY, OF HARTFORD, CONNECTICUT.

TIRE-MAKING MACHINE.

1,042,649.　　　　Specification of Letters Patent.　　Patented Oct. 29, 1912.

Application filed February 11, 1911. Serial No. 607,972.

*To all whom it may concern:*

Be it known that I, LESTER D. CROSBY, a citizen of the United States, and a resident of Hartford, in the county of Hartford, State of Connecticut, have invented certain new and useful Improvements in Tire-Making Machines, of which the following is a specification.

The object of this invention is to produce a machine of the character described having features of novelty and advantage and more particularly to produce such a machine having means for rotating the core at varying speeds and in opposite directions, together with means for turning the core into a number of different positions to facilitate the various operations incident to the manufacture of a tire, also to provide a tool carrying arm and a stock supply rack, both of which are adapted to be moved into operative position with respect to the core one at a time.

The invention also comprises other features of construction which will be more particularly described in the accompanying specification and claims.

In the drawings Figure 1 is a side elevation of a machine embodying my invention. Fig. 2 is a detail plan view of the change speed gear for driving the machine. Fig. 3 is a sectional vertical section of part of the machine seen from the side. Fig. 4 is a rear end view of the machine. Fig. 5 is a detail view of one of the machine rolls. Fig. 6 is a plan view of the machine with the roll carrying head removed.

Referring to the drawings *a* denotes the base part of the main frame of the machine, *b* the roll carrying head secured on said main base part, *c* is the core, *d* in general the pivoted carrying arm, *e* in general the reciprocating stock rack.

The core *c* on which the layers of various materials going to make up the tire are laid in proper succession and pressed, rolled and fitted to the shape of the finished tire and then cured, is fastened to a stub shaft 1 mounted in a bearing 2 in a bracket 3 extending from the main base part *a*, and carries a gear 4 which meshes with another gear 5 carried by a shaft 6 having bearings 7—7 in said bracket 3. At the opposite ends of the shaft 6 is a spur gear 8 meshing with a spur gear 9 on a tubular shaft 10 supported in the main base of the machine, and to the opposite ends of this tubular shaft 10 is a spur gear 11 meshing with a pinion 12 fast to the shaft 13 to the other end of which is secured the beveled pinion 14 meshing with the gear 15 and a shaft 16 which carries the change gear mechanism which is indicated in general at 17. The bracket 3 is carried by a shaft 20 passing through the tubular shaft 10 and having at its rear end a gear 21 meshing with a spiral gear 22 on the shaft 23, to the outer end of which is secured a train of spur gearing down to the hand wheel 24 and it will be seen that by the rotation of this hand gear the bracket can be turned so as to move the core *c* either to a horizontal, vertical or any intermediate position. The shaft 20 also carries a notched stock wheel 25 and a lever 26 is provided notched to engage projections on the stock wheel 25 and normally held in engaging position in order to hold the core in any desired position of adjustment. A handle 27 is provided by means of which the lever 26 can be disengaged from the locking wheel 25 to permit rotation of the shaft 20 by the hand wheel 24. The change gear 17 preferably will provide for driving the core at two speeds in one direction and at one speed in the reverse direction; the last speed which is the same for either direction of rotation is intended to be at a rate of about 20 R. P. M. and the second speed which applies only to one direction of rotation is 220 R. P. M. It will thus be seen that provision is made for mechanically driving the core in opposite directions and at various speeds, which constitutes a very desirable feature in a tire making machine.

The head *b* carries a roll of material known in the trade as "friction cloth", layers of which are stretched and laid on to the core as the first step in the process of building up a tire. This "friction cloth" is carried on a strip of ordinary cloth or canvas in order to separate the layers as they are rolled up on the roll and prevent them adhering. One of these "friction rolls" is indicated at 30 and 31 denotes a roll on which the protecting cloth is wound up as the "friction cloth" is unwound, the weight of the roll 31 resting against the periphery of the roll 30 being sufficient to drive it. Fig. 3 shows a strip of the "friction cloth" being wound on to the core and shows it passing over the stretching and guiding rolls 32 and 33 and the brake roll 34 to the shaft of which is secured the brake drum 35 surrounded by the brake band 36, the threaded stud 37 supported in a pivoted bracket 38 being provided for the purpose of engaging the brake lever 39 to vary the braking action on the brake roll 34. As the "friction" is wound on to the core it is stretched lengthwise, and the brake roll 34 is provided for the purpose of retarding the normal feed of the "friction" thus accomplishing the desired stretching. It is absolutely essential that this "friction" be laid on to the core evenly, the center of the "friction" strip lying on the center line of the periphery of the core. Many times the "friction" is not wound truly on the roll 30 and as a result it will be apparent that the "friction" will not wind truly on to the core unless some means are provided to obviate the difficulty. I have provided such means by pivoting the head $b$ on the base $a$ so that it can swing slightly and in order to facilitate the swinging I have interposed ball bearings indicated at 40. It will thus be seen that as the core draws the "friction" off the roll 30 the head is free and swinging and thus allows the proper winding of the "friction" on the core. In order to prevent any side slipping of the friction I have circumferentially grooved the guide rolls 33 as seen in Fig. 5.

As each layer of "friction" is placed on the core various rolling, compressing and stitching tools carried by the arm $d$ are brought into play to form the material closely about the core, and this tool carrying arm which is pivoted to the base as indicated at 44 is swung around into the position shown at Fig. 3 in order to properly present the various tools to the core. While the "friction" is being wound on to the core the core is rotated in the direction of the arrow in Fig. 3 at a slower rate of speed. After a strip of "friction" is in place the operator by means of the shifting lever 18 throws in the higher speed which is utilized while the various tools are being used to shape the material to the core. This tool carrying arm is provided with a pivoted stop pin 45 which engages a suitable recess in the base to hold it in place. After the layers of "friction" are applied to the core the stop pin 45 is released through the foot lever 46 seen in Fig. 1 and the arm is swung around to the position shown in Figs. 1 and 3. The reciprocating stock rack $e$ is now moved over into operative position, the direction of rotation of the core is reversed to that indicated by the arrow of Fig. 1 and the layers of the different materials are fed from the table 50 up the incline guide 51 on to the core. After each layer of stock is located on the core the rack is moved out of the way and the tool carrying arm is swung around and locked into position, the direction of rotation of the core is reversed and the various finishing tables brought into play. After these operations are finished the arm is again swung around, the rack moved up into operative position, another layer of material put in place on the core, the rack moved and the tool arm swung around again into operative position and the operation is thus continued until the complete tire is built up.

Beads, wire, etc., are laid into the rim edges of the tire and while these operations are being carried out both the tool arm and the rack are removed, the core is turned to a horizontal position while the beads, wire, etc. are being laid in place on one side and the retaining stops are being secured. Then the position of the core is reversed and the same operation takes place on the other side.

In building up tires of different sizes of course it is necessary to have cores of the corresponding size and it is understood that these cores are removably secured to the stub shaft 1. In changing from one size tire to another it is of course necessary to change the position of the tool carrying arm and also of the rack guide 51. As will be seen in Fig. 3, the tool carrying arm is adjustable back and forth by means of the rack and pinion 60 and 61 and set screw 62 being provided to hold the arm in any desired position of adjustment and by reference to Figs. 1 and 6 it will be seen that I have provided a scale 63 graduated to indicate tires of different sizes, the tool arm carrying a pointer 64. By moving the tool arm by the rack and pinion until the pointer 64 indicates on the scale 63 the size of tire which is to be made, an accurate adjustment of the tool arm can be secured insuring the proper positioning of the various tools carried by the tool arm with respect to the core. The rack guide 51 is adjustable back and forth on the table of the rack in order that it may be brought into proper and operative relation to the core.

This machine will greatly facilitate the manufacture of tires owing to the fact that the core is power driven and at varying speeds and also for the reason that the tool arm and the stock rack can be moved away from the core and the core turned to various positions, making it possible for the operator to easily reach all parts of the core to perform the various operations of locating and fastening the various materials and performing the finishing and trimming operations. These features taken in connection with the provisions made for securing even application of the "friction" to the core result in making it possible to materially increase the production of the machine and reduce the cost of manufacture.

I claim as my invention

1. In a machine of the character described, the combination with a base and a roll carrying head, of a core supported from said base, a variable speed gearing, a driving connection between said gearing and said core whereby the latter may be rotated on its own axis at varying speeds and in opposite directions, means for moving said core bodily about a horizontal axis and means for holding said core in any desired position of adjustment.

2. In a machine of the character described, the combination with a frame of a core supported on said frame and adapted for bodily movement about a horizontal axis in order to adjust it in different positions, means for holding said core in any desired position of adjustment and change speed gearing and driving connection between said gearing and said core whereby said core may be rotated on its own axis in any desired position of adjustment.

3. In a machine of the character described, a machine frame, a shaft rotatably mounted therein, a bracket carried by said shaft, a core carried by said bracket and rotatably mounted on its own axis, means carried by said bracket for rotating said core and change speed gearing, driving connection between said change speed gearing and said means, and means for rotating said shaft and the parts carried thereby.

4. In a machine of the character described, a main frame and core carried thereby, mechanical means for driving said core at varying speeds and in opposite directions, means for moving said core bodily about a horizontal axis and a pivotally mounted tool carrying arm adapted for movement into and out of operative relation with respect to said core.

5. In a machine of the character described, a main frame and core carried thereby, mechanical speeds for driving said core at varying speeds and in opposite directions, means for moving said core bodily about a horizontal axis, a pivotally mounted tool carrying arm adapted for movement into and out of operative relation with respect to said core, and a reciprocating stock rack adapted for movement into and out of operative position with respect to said core.

6. In a machine of the character described, a base, a non-rotatable roll carrying head mounted thereon and adapted for slight movement about a vertical axis, a rotatable core and a tool carrying arm mounted in operative position to said core.

7. In a machine of the character described, a main frame, a tubular shaft supported in the frame, a solid shaft extending through said tubular shaft and having its bearing therein, a bracket carried by the solid shaft, a stub shaft having a bearing in said bracket, a core mounted on said stub shaft, an intermediate shaft supported in bearings in said bracket and having a gearing at its forward end meshing with the gearing on the stub shaft, and a gear at its rear end meshing with the gear on the inner end of said tubular shaft, a gear on the outer end of said tubular shaft, a change speed gearing, a connection between said last mentioned gear and said gearing, a gear on the outer end of the solid shaft meshing with a spiral gear on a shaft extending transversely of the frame, means for rotating said last mentioned shaft, a notched stop wheel carried by said shaft, a notched lever coöperating with said stop wheel, and means for operating said lever.

8. In a machine of the character described, the combination with the machine frame, of a bracket arm having one end supported on the frame, its other end projecting out away from the frame, said bracket arm being rotatable, a core mounted at the outer end of said bracket arm and rotatable on its own axis, means for rotating said bracket arm, and means for rotating said core on its own axis.

9. In a machine of the character described, the combination with a frame, and a stock roll supported thereby, of a rotatable core-supporting member, a core mounted on said member in operative relation to said fabric-carrying roll and rotatable upon its own axis, means for rotating said member, and means for rotating said core on its own axis at varying speeds and in either direction.

10. In a tire building machine, the combination with the machine frame, of a rotatable core support, means for rotating the support, means for holding it in any position of adjustment, a core carried by said support and rotatable upon its own axis in any position of adjustment of said support, and means for rotating the core.

11. In a machine of the character described, the combination with the machine frame, of a shaft mounted therein, a rotatable core-supporting member connected with said shaft and by means of which it is rotated, a core mounted on said member and rotatable on its own axis, a second shaft mounted in said machine frame, driving connections between it and said core, means for driving the first mentioned shaft, and means for driving the second shaft in either direction and at varying speeds.

12. In a machine of the character described, the combination with a frame, of a tubular shaft mounted therein, a second shaft passing through said tubular shaft, a core-supporting member carried by said second shaft and rotatable therewith, a core mounted on said member and rotatable on its own axis, driving connections between said tubular shaft and said core, means for rotating said tubular shaft in opposite directions, and means for driving the said second shaft.

13. In a machine of the character described, the combination with a frame, of a tubular shaft mounted therein, a second shaft passing through said tubular shaft, a core-supporting member carried by said second shaft and rotatable therewith, a core mounted on said member and rotatable on its own axis, driving connections between said tubular shaft and said core, means for rotating the tubular shaft in opposite directions and at varying speeds, and means for rotating the other shaft.

14. In a machine of the character described, the combination with a frame, of a tubular shaft mounted therein, a second shaft passing through said tubular shaft, a core-supporting member carried by the second shaft and rotatable therewith, means for rotating said shaft, a core on said member, driving connections between said tubular shaft and said core, and means for rotating said tubular shaft at varying speeds.

15. In a machine of the character described, the combination with a frame, of a stock roll supported thereby, a core and a reciprocating stock rack adapted to be moved into and out of operative relation with respect to the core, means for turning said core bodily about a horizontal axis, and means for rotating said core upon its own axis in opposite directions and at varying speeds.

16. In a machine of the character described, the combination with the machine frame and a stock roll supported thereby, of a rotatable core-supporting bracket and a core mounted thereon, a pivoted tool-carrying arm adapted for movement into and out of operative relation with respect to the core, a reciprocating stock rack adapted for movement into and out of operative relation with respect to the core, and arranged at the opposite side of said core from said stock roll, power driven means for rotating said core on its own axis at slow speed in opposite directions for coöperation either with said stock roll or said stock rack, and power driven means for rotating said core on its own axis at a faster speed for coöperation with said tool-carrying arm.

17. In a machine of the character described, the combination with a base and a roll-carrying head, of a core, reverse speed gearing, driving connections between said gearing and said core whereby the latter may be rotated on its own axis in opposite directions, and means for moving said core bodily about a horizontal axis.

18. In a tire building machine the combination with the machine frame of a rotatable core supporting bracket, means for rotating said bracket, a core mounted on said bracket and rotatable upon its own axis, and means for rotating said core in opposite directions.

19. In a tire building machine the combination with the machine frame of a rotatable core supporting bracket, means for rotating said bracket, a core mounted on said bracket and rotatable upon its own axis, and means for rotating said core at varying speeds.

20. In a tire building machine, the combination with the machine frame, of a rotatable core-support, means for rotating the support, a core carried by said support and rotatable upon its own axis, and means for rotating said core at varying speeds and in opposite directions.

LESTER D. CROSBY.

Witnesses:
E. L. STOUGHTON,
D. K. CURTISS.